United States Patent [19]

Aalto et al.

[11] Patent Number: 4,694,851
[45] Date of Patent: Sep. 22, 1987

[54] FLOW REGULATOR AND ITS USE

[75] Inventors: Erkki Aalto; Veikko Ylä-Hemmilä, both of Kausala, Finland

[73] Assignee: Halton Oy, Finland

[21] Appl. No.: 694,393

[22] PCT Filed: May 17, 1984

[86] PCT No.: PCT/FI84/00038

§ 371 Date: Jan. 7, 1985

§ 102(e) Date: Jan. 7, 1985

[87] PCT Pub. No.: WO84/04804

PCT Pub. Date: Dec. 6, 1984

[30] Foreign Application Priority Data

May 20, 1983 [FI] Finland .................................. 831802

[51] Int. Cl.⁴ .......................... F16K 17/34; F24F 11/04
[52] U.S. Cl. ....................................... 137/499; 137/519; 137/556; 251/285
[58] Field of Search ................ 137/519, 556, 557, 499; 251/285, 286, 287, 305; 138/45, 46

[56] References Cited

U.S. PATENT DOCUMENTS

| | | | |
|---|---|---|---|
| 41,644 | 2/1864 | Shaw | 251/287 |
| 1,281,645 | 7/1970 | Penzensky . | |
| 1,306,006 | 6/1919 | Gustafson | 251/285 |
| 1,311,202 | 7/1919 | Anderson | 137/499 |
| 1,766,876 | 6/1930 | Busby . | |
| 2,247,090 | 6/1941 | Jones et al. | 251/285 |
| 2,376,178 | 5/1945 | Ornstein | 137/557 |
| 2,581,748 | 1/1952 | Blum | 137/499 |
| 2,778,223 | 1/1957 | Kimbrell | 137/557 |
| 3,538,945 | 11/1970 | Dean, Jr. | 137/499 |
| 3,905,390 | 9/1975 | Pysh | 137/519 |
| 4,420,438 | 12/1983 | Goosen | 251/305 |
| 4,523,609 | 6/1985 | Weck | 137/499 |

FOREIGN PATENT DOCUMENTS

| | | | |
|---|---|---|---|
| 74254 | 3/1918 | Austria | 137/519 |
| 2448271 | 4/1976 | Fed. Rep. of Germany . | |
| 2635338 | 4/1978 | Fed. Rep. of Germany . | |
| 3128726 | 2/1983 | Fed. Rep. of Germany . | |
| 64995 | 10/1983 | Finland . | |
| 775544 | 12/1934 | France | 137/519 |
| 1313310 | 11/1962 | France . | |
| 2392302 | 12/1978 | France . | |
| 48558 | 5/1917 | Sweden . | |
| 302677 | 7/1968 | Sweden . | |
| 400391 | 3/1978 | Sweden . | |

Primary Examiner—Martin P. Schwadron
Attorney, Agent, or Firm—Steinberg & Raskin

[57] ABSTRACT

The invention concerns a flow regulator, intended for gaseous substances, in particular for air in air-conditioning and ventilation installations, for maintaining the volumetric flow of the gaseous substance at desired magnitude with sufficient accuracy when the differential pressure acting across the flow regulator varies within desired limits. The flow regulator comprises an envelope and a regulating member disposed in the flow passage confined by the envelope. The flow regulator is provided with limiter members for limiting the differential pressure range of the flow regulator, said limiter members being disposed to restrict the movement of the regulating member. The limiters are adjustable and/or self-adjusting. The flow regulator has a scale for setting the limiter members.

13 Claims, 20 Drawing Figures

FLOW REGULATOR AND ITS USE

BACKGROUND OF THE INVENTION

The present invention concerns a flow regulator for gaseous substances, in particular for air in air-conditioning and ventilation installations, for maintaining the volumetric flow of a gaseous substance at desired magnitude with sufficient accuracy, at a differential pressure across the flow regulator varying within given limits, said flow regulator comprising an envelope and a regulating member disposed in a flow passage confined by the envelope.

In low-pressure regulators known in the art, in which the set-point value of volumetric flow can be regulated in a comparatively wide range, the lowest pressure at which the means starts to operate increases with increasing volumetric flow. Even at small volumetric flow rates, the lowest pressure is generally relatively high. The top pressure also increases in accordance with the set-point value of the volumetric flow.

Owing to the lowest pressure which is high and/or which depends on the set-point value of the volumetric flow, regulators of prior art, in order to operate properly, require extra blower energy and potentially a larger blower; they have a great tendency to cause noise problems due to pressure increase, or a need for damping; they impede the designing; they cause difficulties in the implementation phase of the installation.

As a rule, in flow regulators accurate and stepless setting of the volumetric flow rate at the site of installation, particularly if the regulator has already been installed, is extremely cumbersome, and in practice often impossible, nor can the set-point value of the volumetric flow rate be read directly. In regulators of prior art, the throttling pressure with which the regulator throttles the flow cannot be read either. It is true that in certain regulator designs of prior art dwelling within the operating range can be observed from the outside, but their volumetric flow rate cannot be regulated.

A prerequisite of serial manufacturing, storing, distributing and use of the regulator is that the regulators can with ease and accuracy be regulated at the site of installation even after installation. It is important in view of the balancing and inspection of an air conditioning installation that it is possible to observe from outside the regulator which is the set-point value of the volumetric flow rate, whether the regulator is in the operating range, and how strongly the regulator throttles. In addition, the basic construction and manufacturing technique shall be such that the required calibrating measures are as simple and minimal as possible and independent of the setting of the volumetric flow.

In regulators of prior art, the movement of the regulating member cannot be steplessly limited. Therefore, regulators of prior art cannot be used at all for mere balancing without incurring the risk of binding of the means. Secondly, the regulators of prior art cannot be used for restricted and controlled correction. Thirdly, regulators of prior art cannot be used in the best possible way in air-conditioning installations where the air quantities are varied, such as e.g. different air quantities in daytime and night running.

In regulators of prior art, for counterforce of the regulator member is employed either a mass or a spring, or a spring and bellows in combination. Each of these designs has its advantages and disadvantages. Disadvantages when using springs are, for instance, relaxation of the spring, inaccuracies in manufacturing, susceptibility to damage, etc. Disadvantages of a mass used for counterforce have been that the regulator can only be installed in a horizontal duct, that the axis should always be horizontal with reference to the direction of flow, and that the mass must always be on the same side of the duct. Advantages of a mass used for counterforce are, for instance, reliability in use, good manufacturing accuracy and constancy. Disadvantages of spring plus bellows are that the design is more prone to disturbances and more expensive than a mere spring, and has a shorter life span.

In regulators of prior art, for damping out the oscillations of the regulating member, or the so-called hunting, a particular damping means is required. In certain designs of prior art, dashpot type damping is used. In another regulator of prior art, damping of bellows type is used. Disadvantages of the damping designs described above include the fact that the damping designs may bind in the course of time, or they may be blocked or damaged, that the designs require maintenance, and that they may impair the accuracy.

SUMMARY OF THE INVENTION

The object of the present invention is to provide an improvement in regulator designs known in the art. A more detailed aim of the invention is to provide a flow regulator in which the drawbacks present in regulators of prior art have been overcome.

The aims of the invention are achieved with a flow regulator which is mainly characterized in that the flow regulator is provided with limiting members for limiting the differential pressure range of the flow regulator, said limiting members being disposed to limit the movement of the regulating member.

In an advantageous embodiment of the invention, the flow regulator is characterized in that the limiters are adjustable. In an advantageous embodiment the limiters are self-adjusting. In an advantageous embodiment the flow regulator is provided with a limiter setting scale. In an advantageous embodiment, the limiting members have been disposed to lock, if needed, the regulating member in any given position.

Several advantageous embodiments of the invention are characterized in that the regulating member is a slightly curved plate. The turning angle between the initial and ultimate positions of the regulating member is substantially of the same order at different volumetric flow rates when the differential pressure is the same. The operating range of the flow regulator is advantageously changeable by changing the effective flow aperture between the regulating member and the flow passage. Likewise, the operating range of the flow regulator is advantageously changeable by the aid of a shiftable mass producing a countertorque dependent on the position of the regulating member.

With the flow regulator of the invention, several remarkable advantages are gained, in the flow regulator of the invention, the movement of the regulating member may be restricted, or the movement of the regulating member may, if needed, be altogether arrested. Thanks to this characteristic feature, the flow regulator of the invention may also be used in designs such as balancing based merely on so-called single-pass regulating, whereby no risk of binding of the means exists. Secondly, the flow regulator may be used for restricted and controlled correction, and thirdly, the flow regulator may successfully be used in air-conditioning installations in which there is a desire to change the air flows by centralized action.

Secondly, the flow regulator operates in a comparatively wide volumetric flow range, e.g. duct velocity 2-8 m/s, without changing the pressure range in which the flow regulator operates. In addition, the flow regulator operates with lower differential pressure, e.g. about 20 Pa, than any regulator known in prior art, in which the operating range is 20-200 Pa throughout the line. In the regulator of the invention, it has been understood to utilize the turning angle of the regulating member of about 90°, whereby by regulating also the effective flow aperture a large movement of the regulating member is achieved in proportion to the change of differential pressures, and a relatively wide operating range.

Thirdly, in the flow regulator of the invention, the volumetric a flow rate may be regulated steplessly and simply of the site of installation, even if the regulator has already been installed in place, simply by turning the regulator knob on the flow regulator.

The volumetric flow rate may be read directly on the scale, as well as how much the regulator throttles, and whether the regulator is in the operating range, i.e., whether the correct air quantity is passing through the flow regulator, or too much or too little.

In the flow regulator of the invention, a mass is used advantageously for counterforce. In the regulator of the invention, however, the disadvantages of a mass have been eliminated in practice. The flow regulator of the invention may be installed in a passage running in any direction, and the mass used for counterforce can be mounted on either side of the passage. This is due to the turning axis of the regulating member being installed horizontally by the aid of a levelling means provided in the flow regulator, and the mass is moreover so positioned that the mass is turned an equal amount with reference to the regulating member, but in the opposite direction, as is the deviation in each instance from a basic installation.

The flow regulator of the invention also requires no separate oscillation inhibiting means, certainly no oscillation inhibiting means liable to bind or gather dirt or to become blocked: in general, the counterpressure in the passage alone will keep the regulating member stable. The greatest contribution to this favourable feature comes from the fact that the regulating member is slightly curved, and that the regulating member does not nearly close the passage totally in any position. Therefore, air is enabled to flow past the regulating member on all sides even when the regulating member is in its "closed" position. Other factors contributing to the favourable feature described in the foregoing are, for instance, the size and shape of the regulating member, the position of the turning axis of the regulating member with reference to the regulating member, the size and location of the counterweight, and the limiters of the regulating member.

Thanks to the slightly curved regulating member, the flow regulator can be made accurate, silent, and a slightly curved regulating member like this moves smoothly from one end position to the other.

BRIEF DESCRIPTION OF THE DRAWINGS

The invention is described in detail by referring to an advantageous embodiment of the invention presented in the figures of the drawing attached, but to which the invention is not meant to be exclusively confined.

DESCRIPTION OF THE PREFERRED EMBODIMENTS

Figure 1:
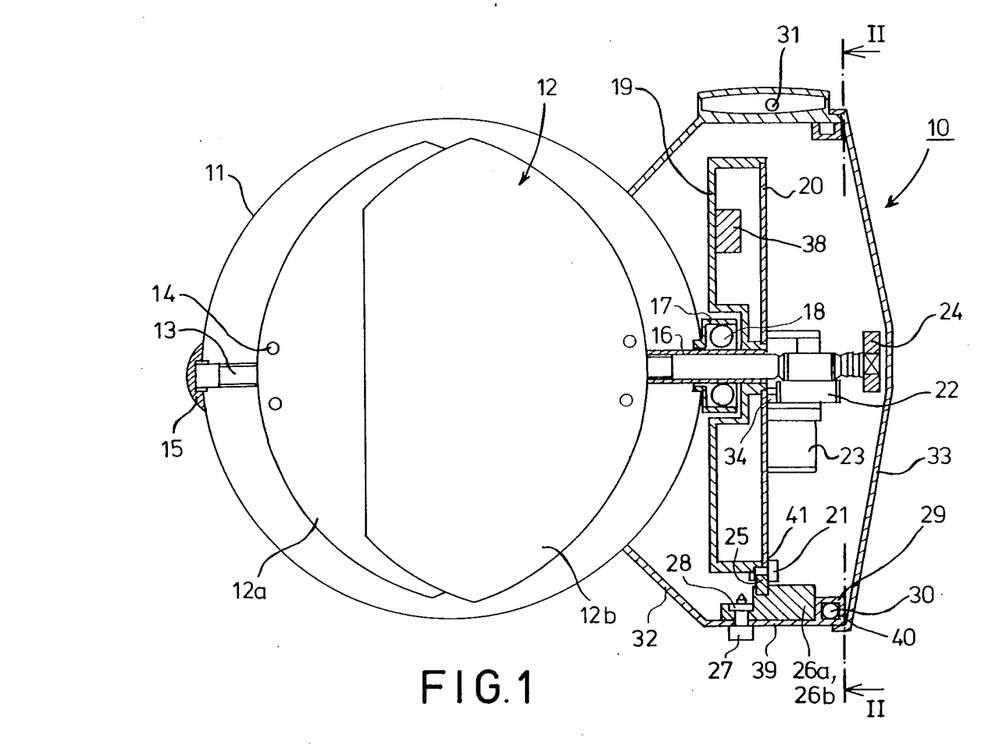
FIG. 1 presents an advantageous embodiment of the invention in a partly sectioned elevational view.
Figure 2:
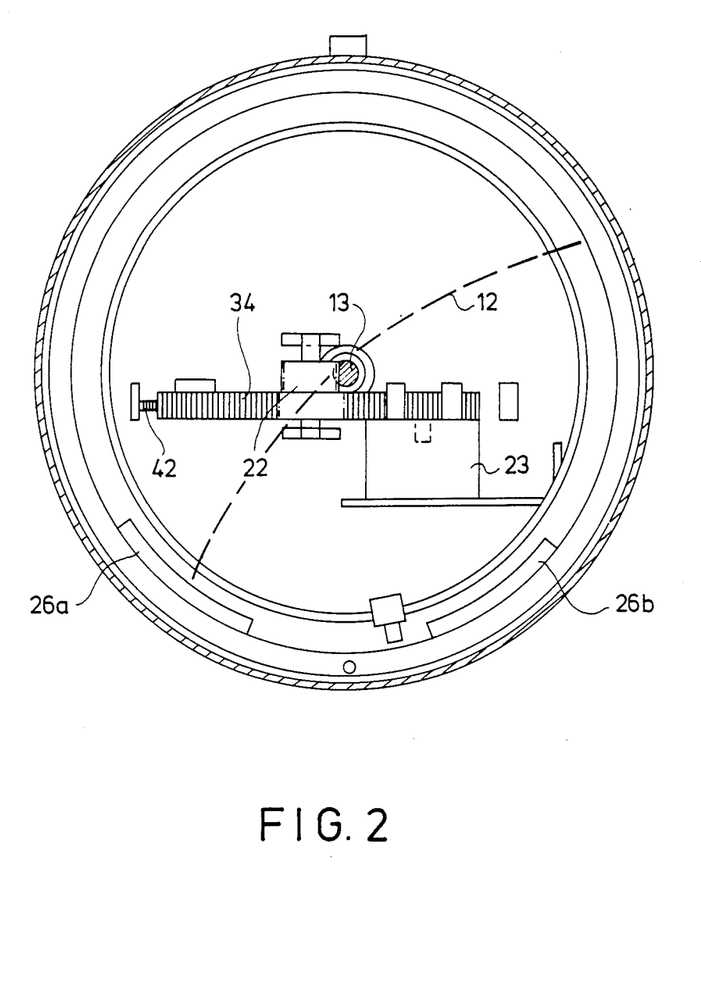
FIG. 2 shows the section along the line II—II in FIG. 1.
Figure 3A:
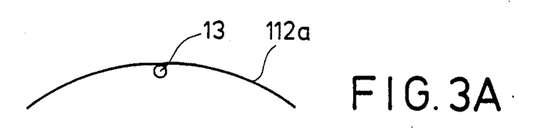
FIG. 3A presents an advantageous embodiment of the regulating member used in the flow regulator of the invention, in schematical elevational view.
Figure 3B:
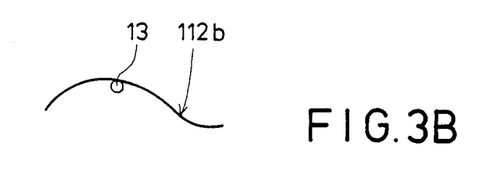
FIG. 3B presents another advantageous embodiment of the regulating member used in the flow regulator of the invention, in schematical elevational view.
Figure 3C:
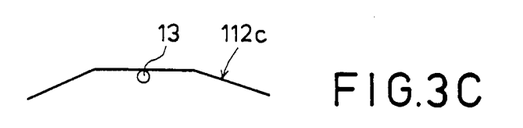
FIG. 3C presents a third advantageous embodiment of the regulating member used in the flow regulator of the invention, in schematical elevational view.
Figure 3D:
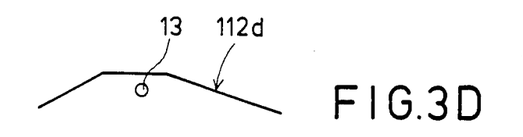
FIG. 3D presents a fourth advantageous embodiment of the regulating member used in the flow regulator of the invention, in schematical elevational view.
Figure 3E:
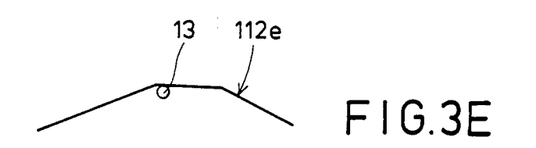
FIG. 3E presents a fifth advantageous embodiment of the regulating member used in the flow regulator of the invention, in schematical elevational view.
Figure 3F:
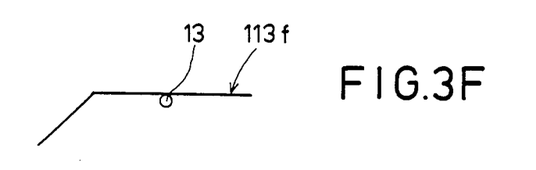
FIG. 3F presents a sixth advantageous embodiment of the regulating member used in the flow regulator of the invention, in schematical elevational view.

In the embodiment of FIGS. 1 and 2, the constant flow regulator of the invention is in general indicated by reference numeral 10. The regulator 10 comprises an envelope 11 and a regulating member 12 disposed in the envelope 11. In the present embodiment the regulating member is a curved flap-resembling regulating member which is composed of two curved flaps 12a and 12b placed to overlap. The regulating member 12 is attached to a turning shaft 13 with an adjusting and fixing nut 14 and with a combined sleeve, adjusting and fixing nut 16.

The shaft 13 is rotatably carried in the envelope 11 by bearings 15 and 18. The regulating member 12 turns in a flow passage defined by the envelope 11 by action of the air flow, and a countertorque produced by a weight 23 has been disposed to place the regulating member 12 in a position producing the requisite throttling effect. The weight 23 is integrally connected to the regulating member 12 by mediation of the sleeve, adjusting and fixing nut 16 and of a member 19 rotatably attached thereto and of a cover 20, and it turns along with the turning movement of the regulating member 12. The shaft 13 is installed horizontally by the aid of a levelling means and a levelling ball 31 provided in the protecting case.

The operating range of the constant flow regulator 10 regarding volumetric flow can be changed by turning the regulating knob 24, whereby in this embodiment the size of the flap-like regulating member 12 and at the same time the effective flow aperture, the location of the weight 23 and the initial and ultimate positions of the regulating member 12 change. The halves 12a and 12b of the flap-like regulating member 12 move with reference to each other in different directions due to the different-handed threads on the shaft 13 and in the adjusting nuts 14,16. One end of the shaft 13 has been locked sidewise in the bearing 15, whereby under effect of adjustment the member 19 rotatably attached by means of the sleeve 16 to the flap-like closing member 12, to one half 12b thereof, as well as the cover 20 attached to said member 19, moves axially with reference to the shaft 13. A gear 22 attached to the cover 20 is in contact with the shaft 13, and the gear 22 is set in rotation by reason of the pinion rack constituted by the grooves on the shaft 13 and of the lateral movement of the rotatably disposed member 19, whereby the gear 22 at the same time over the toothes rack 34 moves the weight 23.

In FIGS. 3A–3F have been presented some advantageous embodiments of the regulating member employed in the regulator of the invention, 10. In FIGS. 3A–3D, the halves with reference to the turning axis 13 of the regulating member, 112a, 112b, 112c and 112d are slightly curved, while in FIGS. 3E and 3F only one half of the regulating member 112e and 112f is slightly curved.

Figure 4A:
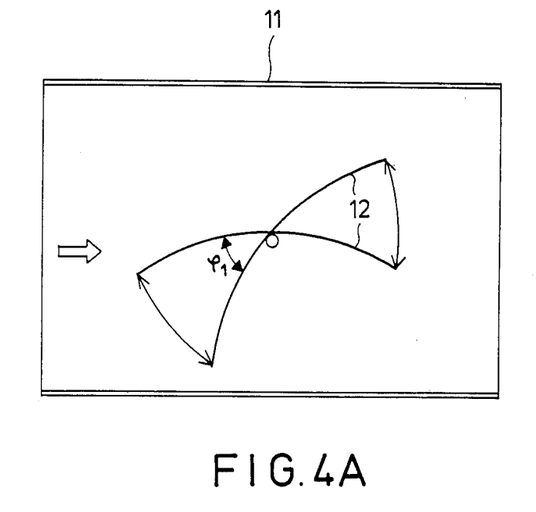
FIG. 4A presents in elevational view the initial and ultimate positions of the regulating member of the flow regulator, at high volumetric flow.
Figure 4B:
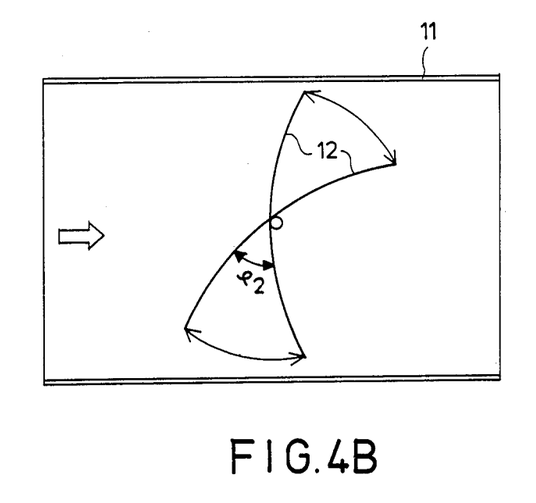
FIG. 4B presents in elevational view the initial and ultimate positions of the regulating member of the flow regulator, at small volumetric flow.

In FIGS. 4A and 4B is observed that at high volumetric flow rate, at the smallest differential pressure of the operation range, the regulating member 12 is in a more horizontal position than at a small volumetric flow rate at the corresponding differential pressure.

Similarly, it is observed that at a small volumetric flow rate at the highest differential pressure of the operation range, the regulating member 12 is in a more vertical position than at a large volumetric flow at the corresponding differential pressure.

The position of the regulating member 12 at the highest volumetric flow rate and at the smallest differential pressure of the operation range advantageously deviates about 90° position of the regulating member 12 at the smallest volumetric flow rate and the highest differential pressure of the operation range. In contrast, the turning angle $\phi_2$ is substantially of the same order as the respective turning angle $\phi_1$ for high volumetric flow rate when the differential pressure is the same. Thus, in the regulator 10 of the invention the rotation angle $\phi_1$, $\phi_2$ of the regulating member 12 for the minimum and maximum differential pressures is substantially of the same order at different volumetric flow rates. At the same minimum and maximum values of the differential pressure $\Delta p$, the angle of rotation $\phi_1$, $\phi_2$ is advantageously about 60°.

Figure 5A:
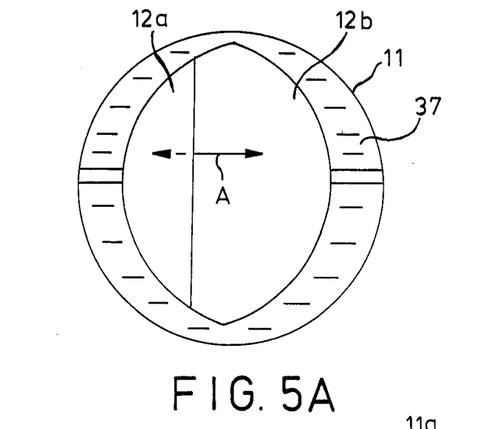
FIG. 5A presents the effective flow aperture of the flow regulator of the invention at the smallest when the regulating member is so regulated that the effective flow aperture is large, viewed from the flow direction.
Figure 5B:
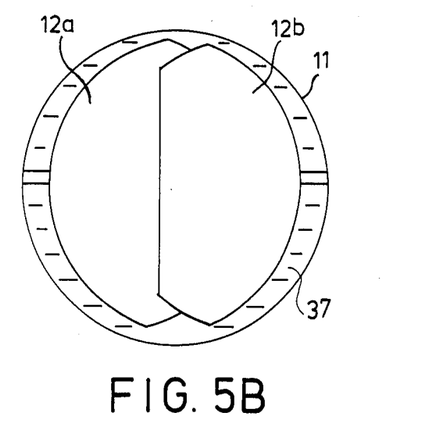
FIG. 5B presents the effective flow aperture of the flow regulator of the invention at the smallest when the regulating member is so regulated that the effective flow aperture is large, viewed from the flow direction.

In the embodiment of FIGS. 5A and 5B, in the flow regulator 10 of the invention the effective flow aperture 37 is changed by regulating the size of the flap-like regulating member 12. In this embodiment, the size of the effective flow aperture 37 is changed by moving the halves 12a and 12b of the flap-like regulating member 12 in the manner indicated by the arrow A in FIG. 5A.

Figure 5C:
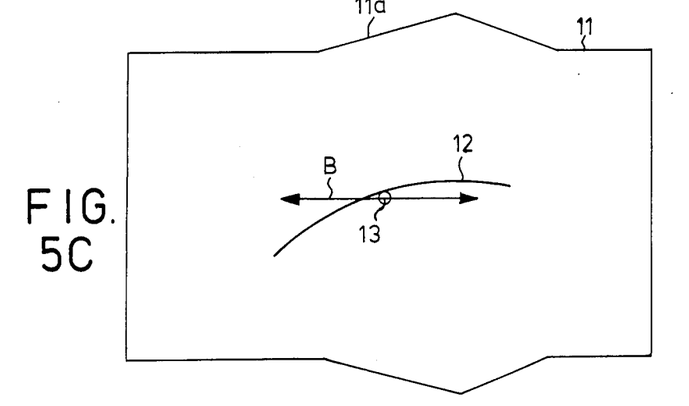
FIG. 5C presents in elevational view the changing of the effective flow aperture of the flow regulator of the invention in a flow passage with variable cross-section.

In the embodiment of FIG. 5C, the effective flow aperture 37 is changed by moving the regulating member 12 in the flow passage 11, 11a with variable cross-section as indicated by the arrow B, in other words, by shifting the regulating member 12 in the direction of flow.

Figure 5D:
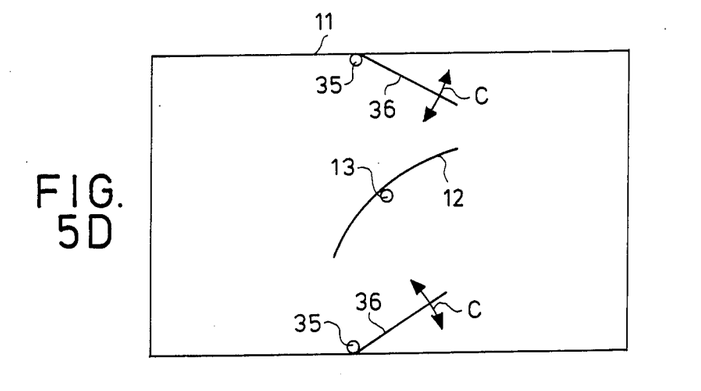
FIG. 5D presents in elevational view the changing of the effective flow aperture of the flow regulator of the invention by means of separate regulating member.

In the embodiment of FIG. 5D, the effective flow aperture 37 is changed by regulating the flow aperture by the aid of a separate regulating member 36, consisting of one or several parts, placed in the flow passage. The shafts of the regulating members 36 are denoted by reference numeral 35. The regulating members 36 may be rotated around the axes 35 as indicated by arrows C.

Figure 6:
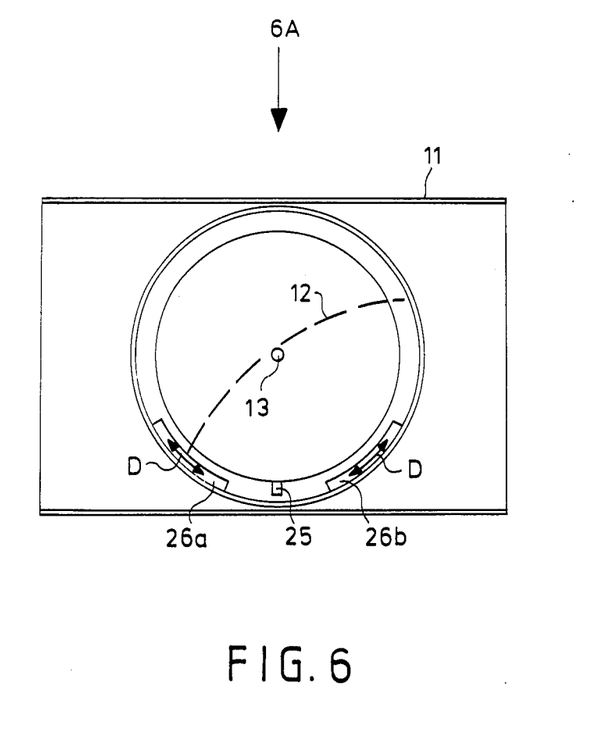
FIG. 6 presents the principle of limiting the differential pressure range of the flow regulator of the invention, in schematic elevational view.
Figure 7:
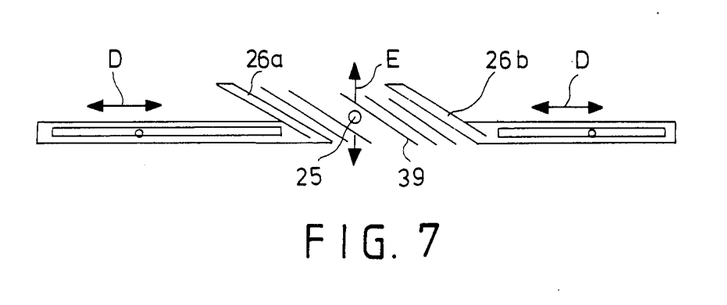
FIG. 7 shows a detail of FIG. 6 viewed in the direction 6A.

In the flow regulator 10 of the invention, the differential pressure range is limited by limiting members 25 and 26a, 26b. When the limiters 26 are moved as indicated by arrows D in FIG. 6, the movement of the regulating member 12 is limited. The limiters 26 are advantageously self-regulating in accordance with the volumetric flow rate that has been selected, as shown in FIG. 7. The limiters 26a and 26b have bevelled faces in that case. The limiters 26a and 26b regulate themselves when a limiter pin 25 moves as the volumetric flow rate is regulated, in the manner indicated by the arrow E in FIG. 7. The movement of the flap-like regulating member 12 of the constant flow regulator 10 may also be arrested totally or partially with the aid of the adjustable limiters 26a and 26b. The limiter pin 25 and the adjusting scale 39 on the protective case 32 indicate the differential pressure $\Delta p$ acting across the constant flow regulator 10. When the limiter pin 25 touches the limiter 26a, the differential pressure $\Delta p$ is at the lowest, and at the limiter 26b it is at the highest (FIG. 7). When the limiter pin 25 is intermediate between the limiters 26a and 26b, the means is in the operating range; if not, either too much or too little air is admitted.

Figure 8:
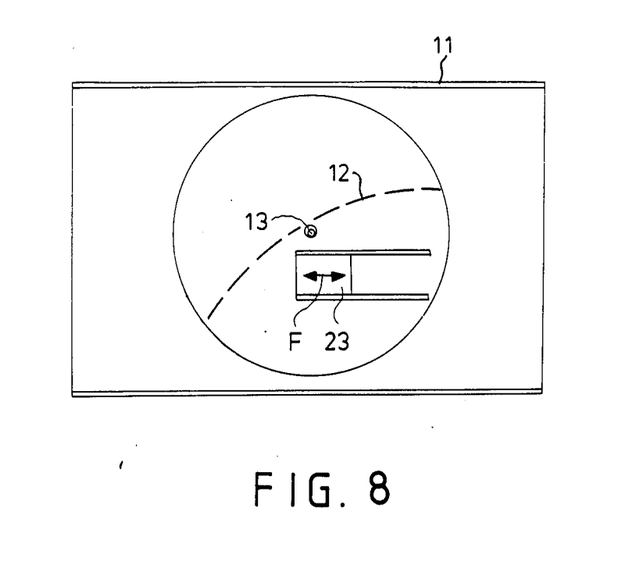
FIG. 8 presents a mode of changing the operating range of the flow regulator of the invention, in schematic elevational view.

As shown in FIG. 8, the operating range of the flow regulator 10 can be changed by the aid of a movable mass or weight 23 by shifting the weight 23 as indicated by the arrow F.

The weight 23 and the limiting members 25 and 26a, 26b automatically assign different initial and ultimate positions to the flap-like regulating member 12 at different volumetric flow rates.

Figure 9:
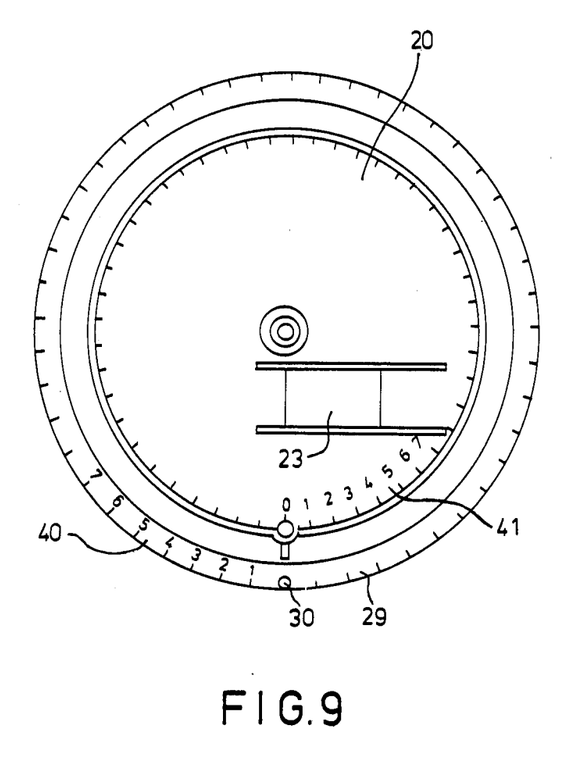
FIG. 9 presents the flow regulator of FIG. 1, seen in the direction from the cover of the protecting case, said cover being removed

In the constant flow regulator 10 of the invention the effect of gravity can be made the same independent of the installation mode by the aid of the fixable cover 20 which is adjustable with reference to the turning axle 13 of the regulating member 12, of the ball case 29 on the protecting case 32 and of the ball 30 moving in the case 29. The constant flow regulator 10 is balanced by a balancing weight 38 in connection with manufacturing without the countertorque produced by the weight 23.

The ball 30 and the scale 40 on the case 29 show in which position the means is. The cover 20 is turned to a position corresponding to the position indicated by the ball 30 by the aid of a scale 41 on the cover 20 and is locked by a set screw 21.

Figure 10:
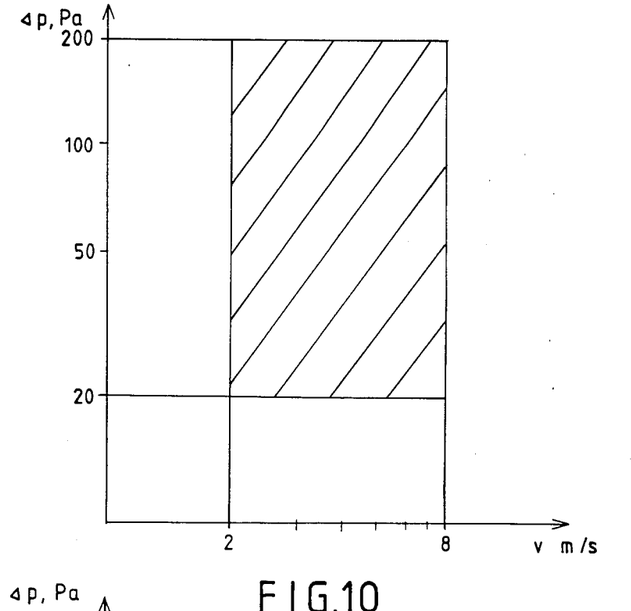
FIG. 10 shows the operating range of the flow regulator of the invention in graphic presentation.

The operating range of the flow regulator 10 of the invention regarding volumetric flow rate $\dot{V}$ can be steplessly regulated so that the differential pressure range in which the flow regulator 10 operates will not change, as presented in FIG. 10, or it can be made to change in any desired manner. In FIG. 10, the hatched area indicates the range in which the flow regulator 10 of the invention operates. In the example of FIG. 9, the ratio of the top and lowest pressures of the operating range is 1:10, or e.g. 20-200 Pa, and the ratio 1:4 of lowest and highest volumetric flow rate $\dot{V}$ is such that it corresponds to air flow velocity 2-8 m/s. The operating range of the constant flow regulator 10 is regulated, as already described, by turning the regulating knob 24. The limiter pin 25 on the rotatably disposed member 19, the limiters 26a, 26b changeable in the direction of the shaft 13 and the weight 23 give the regulating member 12 different initial and ultimate positions at various volumetric flow rates. The end of the gear rack 34 and the volumetric flow rate scale 42 on the cover 20 indicate the air flow to which the constant flow regulator 10 has been regulated. The limiter pin 25 and the scale 39 adjacent to the limiter pin 25 on the protecting case 32, in other words, the scale for setting the limiters 26a and 26b, indicate the differential pressure $\Delta p$ across the regulator 10. If the limiter pin 25 is against one or the other limiter 26a and 26b, the flow regulator 10 is not in the operating range, and too much or too little air passes through the flow regulator 10. The position of the limiter pin 25 with reference to the scale 39 and the limiters 26a and 26b may be determined from outside the means.

In the flow regulator 10 of the invention, the movement of the regulating member 12 may be restricted, or the regulating member 12 may be completely arrested by the aid of the adjustable limiters 26a and 26b, as was already presented above. This affords various possibilities as shown in FIG. 11.

The instance (a) displayed in FIG. 10 illustrates the case that the regulator 10 is only used for balancing an air-conditioning installation. When an air-conditioning installation is being balanced, the regulating member 10 automatically assumes the correct position. Thereafter, the regulating member 10 is arrested by means of the limiting members 26a and 26b. The air-conditioning installation can be balanced in this way with flow regulators, which means that the air quantities are correct at every point in the air-conditioning installation, but the regulators 10 installed in the air-conditioning installation do not strive to maintain the volumetric flow rate $\dot{V}$ unchanged if it tends to change due to an external influence. The air flow may then be altered centrally. Since they have been arrested, the regulators 10 are also under no risk of becoming stuck.

Figure 11:
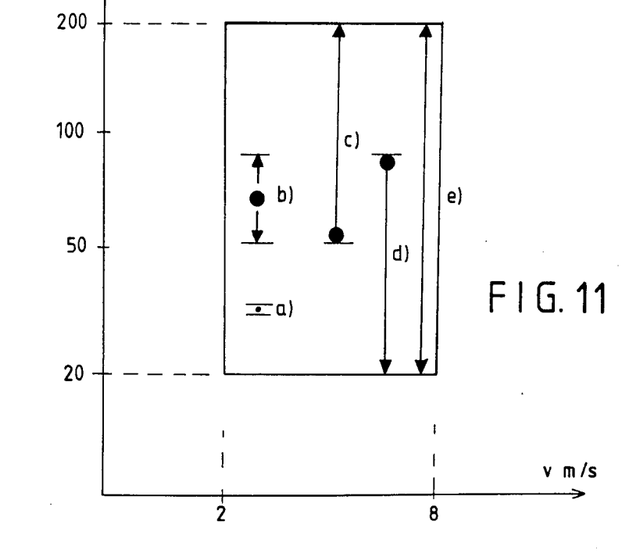
FIG. 11 shows applications of the flow regulator of the invention in graphic presentation.

The instance (b) displayed in FIG. 11 illustrates the case in which the flow regulator 10 is given a small chance of correction, e.g. ±20 Pa. The regulating members 10 assume the correct position at balancing. The regulating members 12 of the flow regulators 10 are not completely arrested with the limiters 26a and 26b in this case; the regulating member 12 is rather given a small latitude of movement in both directions. The flow regulator 10 will then in the event of minor pressure variations correct the volumetric flow rate if the magnitude of the volumetric flow tends to change. On the other hand, if for some reason the flow regulator 10 gets stuck, it will cause no major error even then.

The instance (c) displayed in FIG. 11 illustrates the case in which the air-conditioning installation is balanced with the largest air quantity. The flow regulator 10 is used in air-conditioning installations where air flows of different magnitudes are used. Usually a higher volumetric flow rate is applied e.g. during the daytime. When balancing the air-conditioning installation, the movement of the regulating member 12 is limited by the lowest pressure limiter 26a. One achieves hereby that the regulating member 12 prevents the increase of the air quantity in day operation but causes no problems whatsoever in night operation when the quantity of air is reduced by centralized action. If the regulating member 12 were allowed to turn to its fully open position, some point in the air-conditioning system could in night operation receive nearly as much air as in daytime operation, and another point would correspondingly receive very little.

The instance (d) displayed in FIG. 11 illustrates the case in which the flow regulator 10 is used in air-conditioning installations where air flows of different magnitudes are used. The installation is balanced with a smaller air quantity. The movement of the regulating member 12 of the flow regulator 10 is limited with the top pressure limiting member 26b. The regulating member 12 cannot turn into its closed position, and the regulating member 12 will thus cause no problems when the air flow is increased by centralized action.

The instance (e) displayed in FIG. 11 illustrates the case in which the flow regulator 10 is permitted to correct the air flow rate throughout the differential pressure range in which the flow regulator 10 operates satisfactorily. The limiting members 26a and 26b are in their extreme positions.

In the foregoing are presented merely some of the advantageous embodiments of the invention, and it is obvious that various modifications may be accomplished in them within the scope of the inventive idea presented in the claims following below. For instance, it is not the intention to confine the invention exclusively to ducts or passages having a circular cross section.

We claim:

1. A flow regulator intended for gaseous substances, in particular for air in air-conditioning and ventilation installations for maintaining the volumetric flow of a gaseous substance at desired magnitude with sufficient accuracy at differential pressure across the flow regulator varying within given limits, said flow regulator comprising an envelope and a regulating member disposed in a flow passage confined by the envelope, characterized in that the flow regulator is provided with limiting members constituting means for restricting the differential pressure range of the flow regulator, said limiting members being disposed to limit the movement of the regulating member, wherein minimum and maximum breadth of the differential pressure are arbitrarily determined by said limiting members.

2. A flow regulator according to claim 1, characterized in that the limiters are adjustable.

3. A flow regulator intended for gaseous substances, in particular for air in air-conditioning and ventilation installations for maintaining the volumetric flow of a gaseous substance and desired magnitude with sufficient accuracy and differential pressure across the flow regulator varying within given limits, said flow regulator comprising an envelope and a regulating member disposed in a flow passage confined by the envelope,
characterized in that the flow regulator is provided with limiting members constituting means for restricting the differential pressure range of the flow regulator, said limiting members being disposed to limit the movement of the regulating member, and characterized in that the limiting members are self-adjusting when the set-point value of the volumetric flow rate is changed.

4. A flow regulator according to claim 3, characterized in that the regulating member is disposed to turn when the differential pressure acting across the flow regulator changes.

5. A flow regulator according to claim 1, characterized in that the flow regulator is provided with a setting scale for the limiting members.

6. A flow regulator according to claim 5, characterized in that a limiting pin and said setting scale for the limiting members are disposed to indicate the differential pressure acting across the flow regulator.

7. A flow regulator according to claim 3, characterized in that the operating range of the flow regulator is changeable by changing the effective flow aperture between the regulating member and the flow passage.

8. A flow pressure according to claim 1, characterized in that the regulating member is substantially slightly curved at least on that flow surface which faces the incoming flow of the gaseous substance.

9. A flow regulator according to claim 1, characterized in that the limiting members have been disposed to arrest the movement of the regulating member altogether.

10. The regulator of claim 1, wherein said regulating member is situated upon an axis and disposed to rotate about said axis with increasing differential pressure progressively crosswise with reference to the direction of flow.

11. A flow regulator intended for gaseous substances, in particular for air in air-conditioning and ventilation installations for maintaining the volumetric flow of a gaseous substance at desired magnitude with sufficient accuracy at differential pressure across the flow regulator varying within given limits, said flow regulator comprising an envelope and a regulating member disposed in a flow passage confined by the envelope, characterized in that the flow regulator is provided with limiting members constituting means for restricting the differential pressure range of the flow regulator, said limiting members being disposed to limit the movement of the regulating member, additionally comprising a rotatable shaft upon which said regulating member is situated and disposed to rotate therewith; and a movable limiting member also situated upon said shaft and disposed to be movable with the rotation thereof between positions defined by said limiting members, rotation of said regulating member being arrested when said movable limiting member contacts one or the other of said position limiting members.

12. The regulator of claim 11, wherein said positioned limiting members have bevelled faces.

13. A flow regulator intended for gaseous substances, in particular for air in air-conditioning and ventilation installations for maintaining the volumetric flow of a gaseous substance at desired magnitude with sufficient accuracy at differential pressure across the flow regulator varying within given limits, said flow regulator comprising an envelope and a regulating member disposed in a flow passage confined by the envelope, characterized in that the flow regulator is provided with limiting members constituting means for restricting the differential pressure range of the flow regulator, said limiting members being disposed to limit the movement of the regulating member, wherein a turning angle between initial and ultimate positions of said regulating member is substantially of the same order at different volumetric flow rates with the same differential pressure.

* * * * *